(12) United States Patent
Graupner et al.

(10) Patent No.: US 7,039,705 B2
(45) Date of Patent: May 2, 2006

(54) REPRESENTING CAPACITIES AND DEMANDS IN A LAYERED COMPUTING ENVIRONMENT USING NORMALIZED VALUES

(75) Inventors: Sven Graupner, Mountain View, CA (US); Vadim Kotov, Sunnyvale, CA (US); Holger Trinks, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 942 days.

(21) Appl. No.: 10/044,882

(22) Filed: Oct. 26, 2001

(65) Prior Publication Data

US 2003/0084155 A1    May 1, 2003

(51) Int. Cl.
*G06F 15/173* (2006.01)
(52) U.S. Cl. ...................................................... 709/226
(58) Field of Classification Search ........ 709/217–226, 709/238–244; 715/733–747; 707/100–104.1; 719/311–316; 718/102–105
See application file for complete search history.

(56) References Cited

U.S. PATENT DOCUMENTS

| | | | | |
|---|---|---|---|---|
| 5,414,812 A | * | 5/1995 | Filip et al. ............... | 707/103 R |
| 5,764,740 A | * | 6/1998 | Holender ................ | 379/112.05 |
| 5,889,956 A | * | 3/1999 | Hauser et al. ............... | 709/226 |
| 5,930,156 A | * | 7/1999 | Kennedy ........................ | 703/6 |
| 6,047,320 A | * | 4/2000 | Tezuka et al. ............... | 709/223 |
| 6,085,238 A | * | 7/2000 | Yuasa et al. ................. | 709/223 |
| 6,138,122 A | * | 10/2000 | Smith et al. ............. | 707/103 R |
| 6,141,680 A | * | 10/2000 | Cucchiara ................... | 709/201 |
| 6,154,787 A | * | 11/2000 | Urevig et al. .................. | 710/8 |
| 6,163,544 A | * | 12/2000 | Andersson et al. ......... | 370/422 |
| 6,182,136 B1 | * | 1/2001 | Ramanathan et al. ....... | 709/224 |
| 6,272,544 B1 | * | 8/2001 | Mullen ........................ | 709/226 |
| 6,289,488 B1 | * | 9/2001 | Dave et al. .................... | 716/1 |
| 6,304,639 B1 | * | 10/2001 | Malomsoky et al. .. | 379/112.04 |
| 6,332,163 B1 | * | 12/2001 | Bowman-Amuah ......... | 709/231 |
| 6,336,138 B1 | * | 1/2002 | Caswell et al. ............. | 709/223 |

(Continued)

OTHER PUBLICATIONS

Graupner et al.; A Framework for Analyzing and Organizing Complex Systems, Feb. 6, 2001, HP Laboratories Palo Alto.*

(Continued)

*Primary Examiner*—William C. Vaughn, Jr.
*Assistant Examiner*—Joseph E. Avellino
(74) *Attorney, Agent, or Firm*—Richard P. Lance (57) ABSTRACT

Method and apparatus for representing capacities and demands in a layered computing environment using normalized values for identifying optimal allocations of computing resources. A plurality of server models are established, with each server model including one or more server nodes and each server node having an associated set of capacity attributes. Similarly, a plurality of service models are established, each service model including one or more service nodes and each service node having an associated set of demand attributes. The server models are defined with a layered relationship as are the service models. A node that is part of a model in one layer corresponds to a model in the next-lower layer. The invention normalizes the demand and capacity attributes of the server nodes and service nodes in the different model layer in order to generate optimized mappings of service nodes to server nodes.

15 Claims, 5 Drawing Sheets

U.S. PATENT DOCUMENTS

| | | | |
|---|---|---|---|
| 6,516,350 B1* | 2/2003 | Lumelsky et al. | 709/226 |
| 6,523,036 B1* | 2/2003 | Hickman et al. | 707/10 |
| 6,571,283 B1* | 5/2003 | Smorodinsky | 709/220 |
| 6,628,304 B1* | 9/2003 | Mitchell et al. | 715/734 |
| 6,640,238 B1* | 10/2003 | Bowman-Amuah | 709/201 |
| 6,643,699 B1* | 11/2003 | Liver | 709/226 |
| 6,687,735 B1* | 2/2004 | Logston et al. | 709/203 |
| 6,732,170 B1* | 5/2004 | Miyake et al. | 709/223 |
| 6,763,326 B1* | 7/2004 | Watkins et al. | 703/21 |
| 6,779,030 B1* | 8/2004 | Dugan et al. | 709/223 |
| 6,795,798 B1* | 9/2004 | Eryurek et al. | 702/188 |
| 6,819,668 B1* | 11/2004 | Hackett et al. | 370/360 |
| 2001/0039581 A1* | 11/2001 | Deng et al. | 709/226 |
| 2002/0046286 A1* | 4/2002 | Caldwell et al. | 709/229 |
| 2002/0103631 A1* | 8/2002 | Feldmann et al. | 703/22 |
| 2002/0174207 A1* | 11/2002 | Battou | 709/223 |
| 2002/0198995 A1* | 12/2002 | Liu et al. | 709/226 |
| 2003/0005119 A1* | 1/2003 | Mercier et al. | 709/225 |
| 2003/0028642 A1* | 2/2003 | Agarwal et al. | 709/226 |
| 2003/0051236 A1* | 3/2003 | Pace et al. | 717/177 |
| 2003/0084156 A1* | 5/2003 | Graupner et al. | 709/226 |
| 2003/0101223 A1* | 5/2003 | Pace et al. | 709/206 |
| 2003/0225549 A1* | 12/2003 | Shay et al. | 702/182 |
| 2003/0236822 A1* | 12/2003 | Graupner et al. | 709/203 |
| 2004/0017783 A1* | 1/2004 | Szentesi et al. | 370/256 |
| 2004/0073673 A1* | 4/2004 | Santos et al. | 709/226 |
| 2004/0139085 A1* | 7/2004 | Eryurek et al. | 707/100 |
| 2005/0021513 A1* | 1/2005 | Vedula et al. | 707/3 |
| 2005/0102538 A1* | 5/2005 | Hunt et al. | 713/201 |

OTHER PUBLICATIONS

DeTurck et al. Design and Implementation of a Generic Connection Management and Service Level Agreement Monitoring Platform Supporting the VPN Service; IEEE © 2001.*

F, Mattern, *Verteilte Basisalgorithmen* (Distributed Basic Algorithms), in German, Springer Verlag, ISBN 3-540-51835, 1989.

RFC 1098: *Simple Network Management Protocol (SNMP)*, http://www-usercgi.tu-chemnitz.de/ftp-home/pub/document/rfc/rfc1098.txt, Apr. 1989.

DMTF (Distributed Management Task Force, Inc.): *Specification for the Representation of CIM in XML*, Version 2.0, http://www.dmtf.org/download/spec/smls/CIM_XML_Mapping 20.htm, Jul. 20, 1999.

RFC 2047: MIME (Multipurpose Internet Mail Extensions) Part Three (2047), http://www-usercgi.tu-chemnitz.de/ftp-home/pub/documents/rfc/rfc2047.txt, Nov. 1996.

RFC 2048: MIME (Multipurpose Internet Mail Extensions) Part Four (2048), http://www-usercgi.tu-chemnitz.de/ftp-home/pub/documents/rfc/rfc2048.txt, Nov. 1996.

RFC 2049: MIME (Multipurpose Internet Mail Extensions) Part Five (2049), http://www-usercgi.tu-chemnitz.de/ftp-home/pub/documents/rfc/rfc2049.txt, Nov. 1996.

* cited by examiner

REPRESENTING CAPACITIES AND DEMANDS IN A LAYERED COMPUTING ENVIRONMENT USING NORMALIZED VALUES

RELATED APPLICATIONS/PATENTS

This application/patent is related to the following applications/patents:

"TAILORABLE OPTIMIZATION USING MODEL DESCRIPTIONS OF SERVICES AND SERVERS IN A COMPUTING ENVIRONMENT," by Graupner et al., filed on the same date as this application/patent, and having been assigned Application/Patent No. 10/046,519; and "METHOD AND FRAMEWORK FOR GENERATING AN OPTIMIZED DEPLOYMENT OF SOFTWARE APPLICATIONS IN A DISTRIBUTED COMPUTING ENVIRONMENT USING LAYERED MODEL DESCRIPTIONS OF SERVICES AND SERVERS," by Graupner et al., filed on the same date as this application/patent, and having been assigned Application/Patent No. 10/046,516.

FIELD OF THE INVENTION

The present invention generally relates to deployment of complex software systems in distributed computing environments, and more particularly to generating and maintaining an optimized deployment of a software application in a distributed computing environment.

BACKGROUND

Software applications are often described in terms of the services provided by the applications to the end users. A service is a function provided by the application and may call on other services to accomplish the function.

Some large-scale applications are distributed in order to make efficient use of the computing power available in multiple systems. Not only are complex applications commonly distributed across multiple systems, but the systems are distributed between multiple data centers. The distances that separate data centers may range from city-to-city, country-to-country, or even continent-to-continent, depending on the application requirements. Not only may an application be distributed between data centers, but the services provided by the application may also be distributed between data centers.

Within a data center, various computing systems ("servers") may be interconnected to form a clusters that are dedicated to performing one or more tasks associated with one or more applications. The number of servers in a cluster is selected as a function of the anticipated computing requirements of the application and the computing capacity of the servers.

Deploying a distributed application in a large-scale computing environment is a complex task. The process of selecting which services should be provided by which data centers, which servers should be clustered, and which tasks should be performed by which clusters requires significant analysis of the computing demands of the application and the capacities of both the hardware and software. A great deal of estimation may be involved. Furthermore, the software itself may be configurable to be more responsive to users. For example, application tasks are assigned to application processes, and each process may have a certain capacity for processing tasks, for example, thread count.

A system and method that address the aforementioned problems, as well as other related problems, are therefore desirable.

SUMMARY OF THE INVENTION

The invention represents capacities and demands in a layered computing environment using normalized values for identifying optimal allocations of computing resources. A plurality of server models are established, with each server model including one or more server nodes and each server node having an associated set of capacity attributes. Similarly, a plurality of service models are established, each service model including one or more service nodes and each service node having an associated set of demand attributes. The server models are defined with a layered relationship as are the service models. A node that is part of a model in one layer is correlated with a model in the next-lower layer. The invention normalizes the demand and capacity attributes of the server nodes and service nodes relative to base units that are individually chosen for each service or server model in the different model layers in order to generate optimized mappings of service nodes to server nodes.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

The present invention is described in terms of an example embodiment having specific layers of models that characterize the services provided by the application and the hardware on which the software components execute. Those skilled in the art will appreciate that other software and hardware model layers could be implemented in accordance with the present invention.

Figure 1:
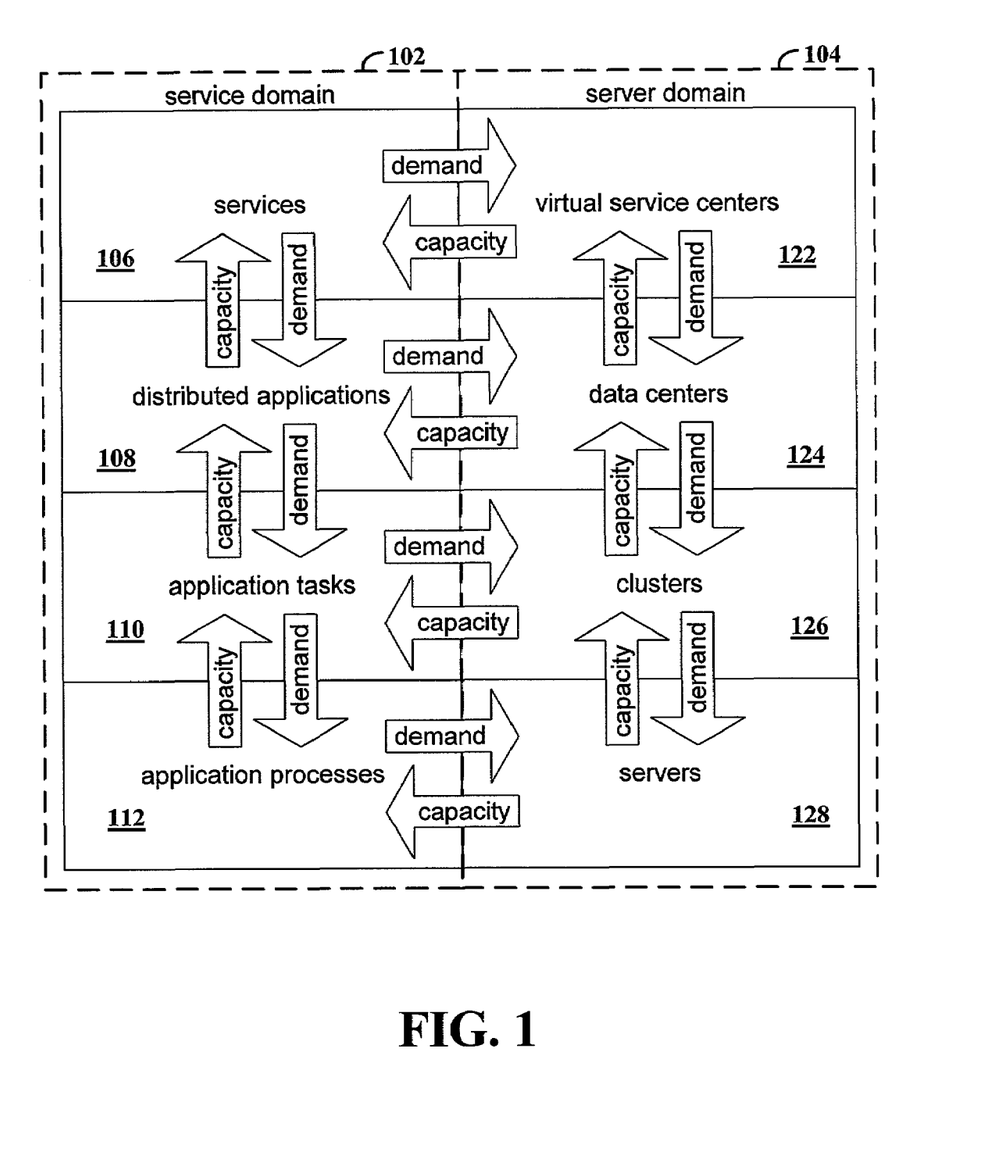
FIG. 1 is a block diagram that illustrates capacity and demand relationships between layers of models that describe the software and hardware in a distributed computing environment.

FIG. 1 is a block diagram that illustrates capacity and demand relationships between the layers of models that describe the software and hardware in a distributed computing environment. Service domain 102 refers to the model layers that describe the services provided by the software application and the software components that provide the services. Server domain 104 refers to the model layers that describe the hardware that executes the software components in the service domain.

Services model layer 106 is the top layer in the service domain. The services model layer describes sets of distributed applications that cooperate to accomplish one or more application tasks. Distributed applications model layer 108 describes sets of application tasks that are performed at different geographic locations. Application tasks model layer 110 describes application tasks that are assigned to individual locations, with each task representing a share of an application that is performed at the location. "Location" refers to host machines ("servers") or environments to which applications or tasks are assigned. Application processes model layer 112 describes locations of the application processes.

Virtual service centers model layer 122 is the top layer in the server domain. The virtual service centers model layer describes sets of service centers that are available to cooperatively perform one or more services. The data centers model layer 124 describes physical sites that have servers. The clusters model layer describes sets of servers that are interconnected and available to cooperatively perform selected application tasks. Finally, the servers model layer describes the individual servers present in the computing environment.

Model layers 108, 110, 112, 122, 124, 126, and 128 include components that are characterized by capacity attributes. The capacity of a component refers to the computing resources that are available to assign to the components in adjacent model layers. For example, the components of clusters model layer 126 have capacities that can be assigned to the components in the application tasks model layer 110 and to components in the data centers model layer 124. The components in the services model layer 106 do not have a capacity attribute since there is no higher level model to which the services are to provide a capacity.

Model layers 106, 108, 110, 112, 122, 124, and 126 include components that are characterized by demand attributes. The demand attribute of a component refers to a quantity of a computing resource required by the component to perform the associated function. For example, each component in the cluster model layer requires a certain quantity of processing capacity, which can be satisfied by the capacities of one or more components in the servers model layer 128. The components in the server model layer do not have a demand attribute since there is no lower level model from which capacity can be assigned to the server components.

With the present invention, the capacities and demands of the components in the various model layers are correlated both within a domain and from one domain to another. For example, within the service domain, the demand by the services is correlated with the capacity available from the distributed applications. From the service domain to the server domain, the demand of the distributed applications is correlated with the capacity available from the data centers. The correlation of the demands and capacities of the components within and between the domains provides an optimal organization for a complex software and hardware computing environment.

Since congestion may occur at any layer and thereby degrade the overall system performance, it would be desirable to capture the level of demand for computing resources and correlate the level of demand with the available capacity, both from models in the service domain to the models in the server domain and between models within the service domain and between models within the server domain.

Figure 2:
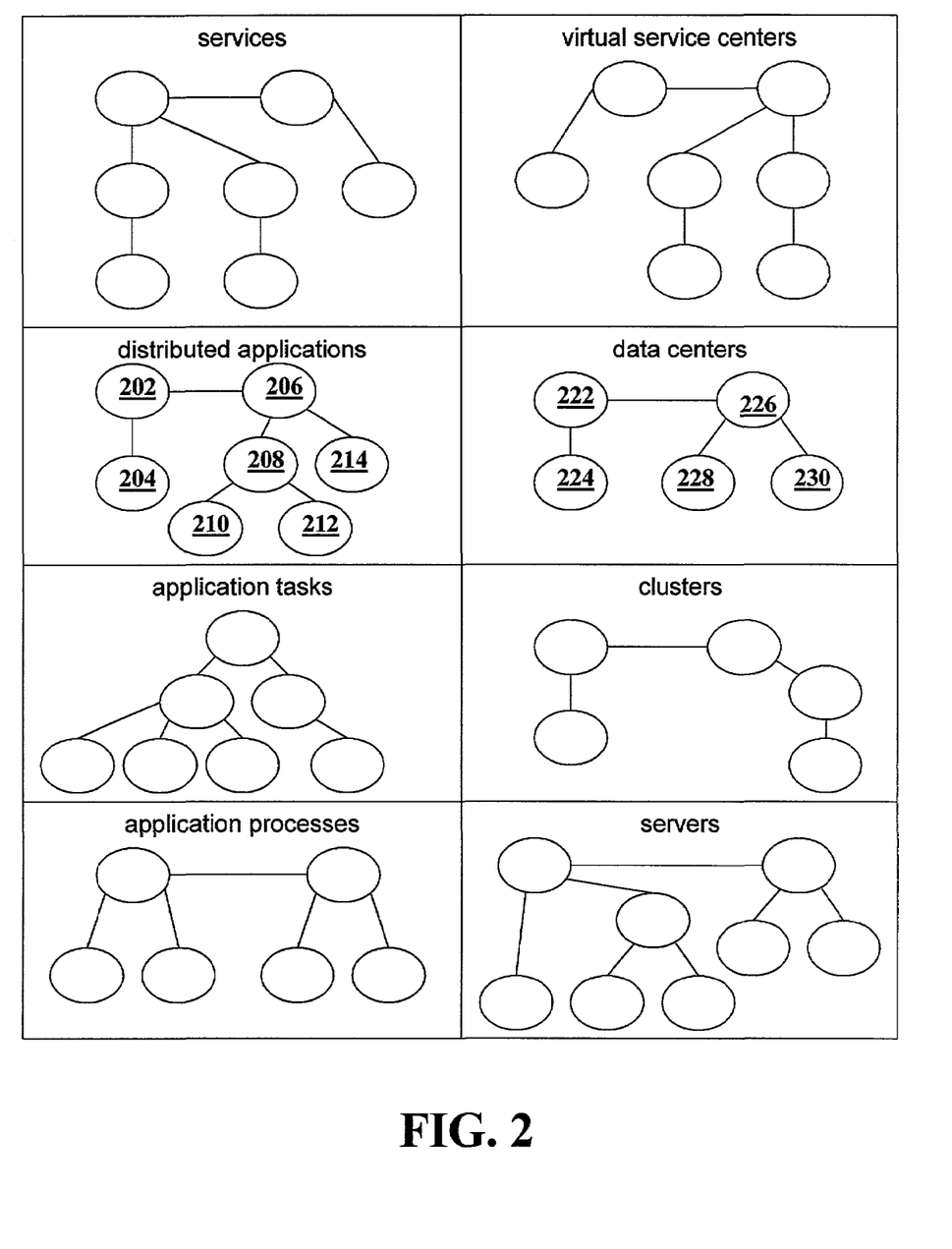
FIG. 2 is a diagram that illustrates example models within the model layers of the service domain and the server domain.

FIG. 2 is a diagram that illustrates example models within the model layers of the service domain and the server domain. The common abstractions used in model descriptions are based on queuing theory and process-oriented, dynamic traffic modeling, and further enhanced by mechanisms that express demands and capacities.

Model descriptions express a topology of constituent components (or "nodes"), the parameters to components and links, and the hierarchical relationships between the components. The topology of a model is described in terms of nodes, some nodes having and some nodes not having memory. Links express relationships between the nodes. For example, the links in the example presented below represent communications channels that connect the nodes. Depending on user requirements, links represent physical network capacity, network activity among servers, or communication activity among services.

A model description also expresses parameters for nodes and links. For example, the parameters may be either fixed or static and pertain to metrics such as throughput, processing capacity, and transmission times.

Hierarchical relationships between the nodes are expressed in the model description. For example, parent and child relationships are expressed in the model description.

Finally, the model description describes the elements that are used as input data in simulations for purposes of prediction or evaluation of possible deployment solutions. The framework contains a discrete-event-based simulation engine. Input data to the simulation engine is partially provided by model descriptions. For example, the topology (which nodes exist and how they are connected) and parameters of nodes and links (processing and communication capacities) are set forth in the model descriptions. Further input data are configured in association with nodes that act as generators. For example, some nodes are configured to generate traffic (or data flow) during the simulation at a rate that is also configurable. Traffic then travels along the communication links to other nodes.

The processing in a node is simulated with a time delay that simulates the processing performed by the node and expires when the node generates traffic. The traffic from the node is passed through outbound links to further nodes. The time delay and output traffic parameters are derived from the processing capacity parameter specified in the model description of that node. This simplification avoids further assertions of parameters for nodes and links specifying their behavior in more detail. However, if more accuracy is required, additional parameters for time delays, processing times, and distribution of output traffic can be included in model descriptions.

Various workload scenarios can be evaluated by manipulating traffic generation rates in traffic generator nodes and also by changing capacity parameters of nodes and links. Simulation runs with various parameter sets support further investigation of alternative arrangements in the system, such as locations of services and accessed data.

Models provide a view of the arrangement of software and hardware components in a complex computing environment. In FIG. 2, the ellipses represent the nodes in the models, and the lines that connect the nodes represent communication relationships between the nodes. For example, the distributed applications model includes nodes 202, 204, 206, 208, 210, 212, and 214 that communicatively are related as shown by the links. The data center model includes nodes 222, 224, 226, 228, and 230, with each node representing a particular data center. The links represent communications channels between the nodes.

The model layers represent a hierarchical relationship between the nodes of a layer and the models of the next lower layer. For example, node 202 in the distributed application layer corresponds to a model in the application task layer. Thus, each node in a layer has a corresponding model in the next lower layer.

In one embodiment, the invention determines an optimal mapping of the distributed application model to the data center model. That is, the mapping indicates a desirable deployment of the particular distributed applications on the particular data centers. The capacity attributes in the data center model and the demand attributes in the distributed applications model are used to determine the mapping. In another embodiment, the invention monitors resource usage in the environment and uses that information to determine alternative configurations.

The invention also determines optimal mappings within a domain. In performing a mapping/correlation within the service domain, it is assumed that a service node in one model layer can be potentially mapped to any node having sufficient capacity in an adjacent, lower model layer. Because this is not always feasible, an affinity/repulsion matrix is used to express mapping constraints. For example, a particular service that must be assigned to a specific node has a value of 1 in the matrix, and a service that must not be assigned to a node has an associated value of −1.

An example application task that is suitable for assignment to different processes is a web server running within a server farm. Multiple http processes represent a web server, and a load balancer gates requests based on a selected policy, for example to balance the processing load between http processes. This can be viewed in the context of the service model as assignment (or mapping) of an application onto several processes. Another example is a distributed database. In a distributed database system processes run on several machines and requests are distributed among those processes.

Within the server domain, the term "server" represents a whole platform that is capable hosting services. Examples of servers are machines, as well as clusters of machines located at different places and coupled to form one logical environment to host all the software of a service. A "cluster server" needs to be mapped onto individual machines to define the cluster. In one embodiment, the mappings are fixed associations. Alternatively, the mappings are flexible, resulting in "virtual" computing resources. Virtual computing resources means that a service only sees a virtual server environment, which appears as a set of machines. Physical machines are assigned to the virtual server environment, and the associations are flexible in time. Thus, virtual computing resources in the server environment can be re-assigned to different underlying physical machines.

For mapping and correlation within the server domain, models that define an initial configuration are required. For example, the initial models specify which virtual server from the virtual server environment is mapped to which physical server machine. One model describes a level of demand that needs to be provided by the virtual server environment in order to meet the processing requirements that services will require when running in this environment. The other model describes a capacity level of the underlying physical machine infrastructure. Taking both models, the virtual servers are mapped onto selected physical machines consistent with the capacity of the physical machines and demand of the virtual servers. The mapping decisions are sent to the data center infrastructure in order to implement the mappings.

In one embodiment, models are described for internal processing in a Lisp-like input language. In another embodiment XML representations are generated and are used for external access and processing of those descriptions. In an example embodiment, the layered relationships between the models are accomplished by recursively defining the layered relationships using the features of the selected language. These descriptions are interpreted by a model interpreter that translates the descriptions into demand and capacity attributes for purposes of correlation.

Figure 3A:
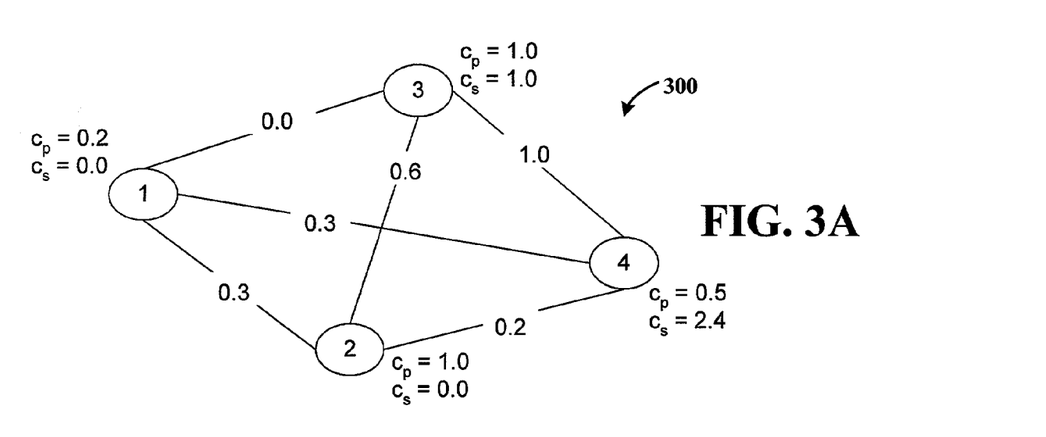
FIG. 3A illustrates in graph form a specific example of a model.

FIG. 3A illustrates in graph form a specific example of a model. Model 300 includes nodes 1, 2, 3, and 4. While 4 nodes are illustrated in the example model, it will be appreciated that more or fewer nodes may be defined in other specific examples. Each of the nodes has associated therewith capacity attributes, $c_p$ and $c_s$, for processing and storage, respectively. While not shown, it will be appreciated that the nodes also have associated demand attributes. Capacity attribute $c_p$ describes a number a work units (e.g., requests, jobs or tasks) per unit time. Capacity attribute $c_s$ describes a quantity of storage available for a selected unit of data. The capacity attributes are expressed in terms of normalized parameters as explained below.

The lines that connect the nodes represent transport capacities between the nodes, and the values associated with the lines quantify the transport capacities. For example, the transport capacity between nodes 1 and 4 is 0.3, which represents data units per unit of time. While not shown, it will be appreciated that there are transport demand values that are also associated with the lines. A transport capacity value of 0.0 indicates that there is no link or no communication between the nodes.

The capacity and demand attributes for processing, storage, and transport are expressed relative to selected base units in order to enable correlations between different model layers. Specifically, all the demand and capacity attributes parameters are normalized. For example, instead of characterizing one machine node with a processing capacity of 4 CPU's of type IA64 and another machine with 16 CPU's of type PA850, one of the platforms is assigned it the processing capacity of 1.0 (=base unit). The capacity of the other platform is then expressed relative to this base unit. If one IA64 CPU has the processing capacity of two PA850 CPU's, and the four-CPU IA64 machine is chosen as base unit, the resulting processing capacities for both machines would be: 1.0 for the IA64 machine and 2.0 for the PA850 machine. The demand attributes in the model layers are also normalized. The capacity and demand attributes are normalized in all the model layers. In other embodiments, other capacity or demand attributes (besides processing, storage, and transport) may be used to model a computing environment.

In the upper model layers in the service domain it is difficult to obtain actual processing, capacity, and transport attribute values. However, the values can be estimated, for example, by referencing system specifications or sizing tables that are provided by software vendors. The attribute values may be defaulted to 1.0 when no other information is available. The present invention provides means to validate and calibrate these attribute values by observations using information gathered while the application system is running. Realistic attribute values will evolve over time by continually adjusting estimated demand and capacity attributes in models in response to monitored behavior of the system.

Figure 3B:
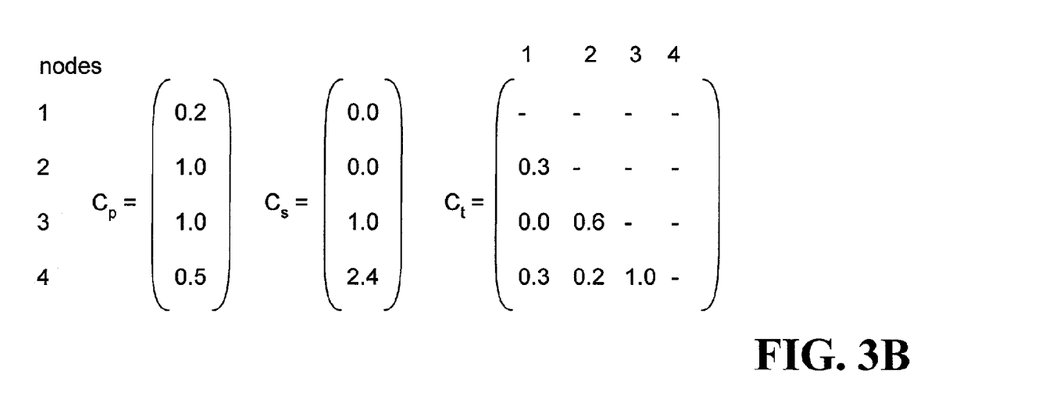
FIG. 3B illustrates the vectors and matrix that characterize the capacity of the model of FIG. 3A.

FIG. 3B illustrates the vectors and matrix that characterize the capacity of the model 300 of FIG. 3A. The nodes in a model are represented by capacity and demand vectors and matrices. For brevity, FIG. 3B illustrates only the capacity vectors and matrix.

The example model employs vectors to represent the $c_p$ and $c_s$ attributes of the nodes in the model and a matrix to represent the transport capacity attribute values. The $C_p$ vector contains the processing capacity attribute values, and the $C_s$ vector contains the storage capacity attribute values. The $C_t$ matrix contains the transport capacity attribute values. The demand attributes are represented with vectors $D_p$ and $D_s$ (not shown) and matrix $D_t$ (not shown).

The first element in $C_p$ indicates that node 1 has a processing capacity of 0.2 or 20% of the selected base processing capacity. Nodes 2 and 3 each have processing capacities of 1.0, which is the base capacity. Node 4 has a processing capacity of 50% of the base capacity. Respective storage capacities are shown in vector $C_s$.

The transport capacities between nodes are indicated in matrix $C_t$. For example, the transport capacity between node 1 and node 2 is 0.3, or 30% of the selected base capacity. Even though only the cells at column j, row i (for i>1 and i not equal to j) are populated with attribute values, it will be appreciated that cells at row j, column i (i<4 and i not equal to j), could also or alternatively be populated with the appropriate capacity values.

In addition to capacity and demand attributes, particular applications may require that additional constraints be satisfied when correlating models. For example, there may be some application tasks that cannot be allocated to certain data centers for legal reasons. An affinity/repulsion constraint matrix, $C_{ar}$, (not shown) is used for expressing constraints between models. Each element in $C_{ar}$ represents a correlation from the demand side in one dimension and from the capacity side in the other dimension. Probabilistic values between +1.0 and −1.0 express the likelihood that two nodes will be associated, with a value 1.0 indicating the nodes must be associated, and a value −1.0 indicating that nodes must not be associated. A value between 1.0 and −1.0 represents the degree of affinity or repulsion between two elements and is taken into account when determining mappings. The neutral value 0.0 is assumed as default.

Figure 4:
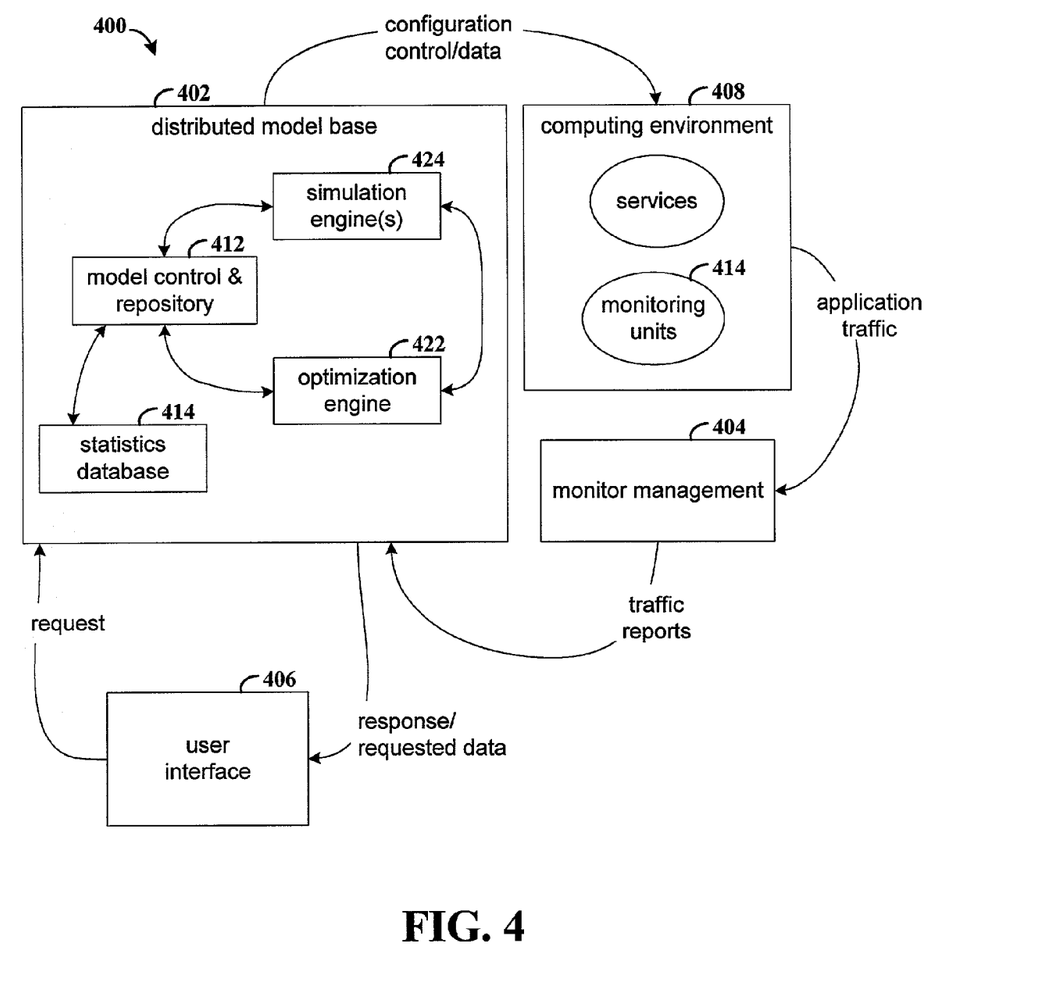
FIG. 4 is a functional block diagram of a system for evaluating and managing a configuration of a complex computing environment, in accordance with one embodiment of the invention.

FIG. 4 is a functional block diagram of a framework for evaluating and managing a configuration of a complex computing environment, in accordance with one embodiment of the invention. Framework 400 is a computer-based system that provides an environment for defining models, maintaining model descriptions, evolving models with the modeled environment, correlating model descriptions, and adapting models to changing characteristics of the modeled environment. Framework 400 includes distributed model base 402, monitor manager 404, and user interface 406. Computing environment 408 includes the software and hardware components that are modeled by framework 400.

Framework 400 is distributed and includes multiple locations for model bases and monitoring. Standard interfaces (e.g., HTTP and e-mail protocols) are used for communication and XML is used for external representation of models, monitoring data, events, and other data representations in the framework.

Framework 400 observes various operating parameters of computing environment 408, processes the parameters, and extracts the information needed for the attribute sets of the models. This supports keeping model attributes current, calibrating model attributes, and discovering inconsistencies between assumed attribute values and observed parameters.

The user interface 406 allows the user to display and manipulate the various models and attribute values.

Model descriptions are maintained in distributed model base 402. Model control and repository 412 manages access to models and stores the model descriptions.

When computing environment is operational, monitor management 404 receives application traffic from monitoring units 414, which are deployed at the various sites and layers of the environment being monitored. The monitor management provides environment traffic reports to the distributed model base, which stores the data in statistics database 416 for later reference. Via user interface 406, a user views the operational data that was gathered and stored in the statistics database and compares the operational data to the various model attribute values. Based on the observed behavior, the user can modify the model attribute values and correlate selected ones of the updated models. A new configuration is then communicated from the distributed model base to the computing environment.

Model control 412 invokes optimization engine 422 for correlating models. The optimization engine examines the capacity and demand attributes of user-selected models and applies a user-selected optimization method to the models. The output of the optimization engine is a mapping of nodes in the demand model to nodes in the capacity model. The optimization engine provides the new configuration to the model control for storage in the repository.

Simulation engine 424 is invoked by model control 412 in response to a user request. The simulation engine simulates operation of the computing environment so that the suitability of a proposed configuration can be evaluated. For example, after having run the optimization engine on selected models, the user can simulate operation of the computing environment using the new mapping.

Monitor management 404 provides the link into the managed computing environment 408. Monitoring units 414 observe operating parameters of application, for example, observing the load on an application by reading a log file or interfacing with an existing monitoring infrastructure. Parameters are filtered and processed through the monitor management and sent as traffic, capacity, and demand reports to the model control 412. The model control assigns the parameters to and compares the parameters with corresponding attribute values in the model descriptions. Monitoring serves the purpose of delivering measured data for model validation and calibration and the discovery of divergence between assumed parameters in models and observed behavior in the framework.

Monitoring units 414 are passive in the sense that they do not initiate action in the monitored system. An additional objective is for monitoring to be non-intrusive to the monitored system. The monitoring units perform the task of monitoring the behavior of selected components in a system. Generally, the monitoring units gather raw status data and detect raw events from observed components. The raw data are filtered and condensed into primitive status variables, for example, a variable indicating a CPU load of 80%. The monitoring units also detect events from system status or state changes.

Input data to monitoring units are provided by sensors (not shown). Sensors are responsible for gathering data about the observed components. Sensors generate "raw" input data for further processing by monitoring units.

Interface sensors provide links to other monitoring or management systems for the purpose of collecting information from these sources. Simple Network Management Protocol interface sensors are an example. Interface sensors can also provide hooks into other management systems such as OpenView from Hewlett-Packard Company.

Connector sensors link monitoring units together, which enables dissemination topologies for monitoring data, for example, hierarchies that correspond to domain structures. One monitoring unit delivering data to another monitoring unit plays the role of a sensor from the receiving unit's perspective.

Status variables represent discrete values for observed analog parameters such as an observed load measured between 0% and 100%. Functions transform primitive into composite status variables. Discrete state variables are not defined by ranges of numeric types but by explicit state sets. For instance, a state variable may represent load as low, normal, or high. Functions map status variables into state variables. Mapping status into state variables provides further filtering and abstraction. State machines then can be applied to perform transitions upon state variables in order to derive higher-level composite states and detect event conditions based on state transitions that have occurred.

Events are defined by event conditions. Event conditions are represented by Boolean functions derived from a set of status or state variables maintained in a monitoring unit. The Boolean function is evaluated on any change of any of the dependent status or state variables. If the function evaluates to 'true', an event has occurred and further action is initiated.

The output data from a monitoring unit is higher-level status or state information, for example, notifications about changes in status or state variables and further events based on event conditions.

Reported monitoring data is locally time-stamped when issued to other units. In one embodiment, monitoring units collect selected monitoring data over a period of time, which supports statistical evaluations (traces, use patterns, workloads, traffic, error behavior and more). Statistics are collected in databases that are separate from monitoring units.

Subscription mechanisms provide the flexibility for building arbitrary dissemination topologies for monitoring data. Depending on the environment, the dissemination topologies take the form of hierarchies or peer structures. Other characteristics of a subscription include how and when monitoring data are sent to subscribers. Three types of subscriptions are supported: "scheduled push"—reports are sent according to configurable schedules (e.g., every 100 ms, every Monday, 10 o'clock, etc.); "event-driven push"—reports are sent at the occurrence of events; and "subscriber poll"—reports are sent on request of subscribers.

The optimization engine 422 maps the demand of a selected model to the capacity of another selected model. The information generated by the optimization engine can be used to improve the overall design and organization of global-scale enterprise and e-services systems.

The optimization engine provides a variety of optimization methods for correlating models. The multiple optimization methods allow the user to try different optimization methods and experiment with different solutions. The optimization methods include, for example, a genetic algorithm and a simulated annealing algorithm. Problems are characterized by finding a mapping of elements of set A onto elements of set B, where the mapping satisfies selected optimization criteria as expressed by an objective function. In one embodiment, the optimization engine includes multiple objective functions, with the user having the option to choose a function that is suitable. One example objective function seeks to balance the processing load between the nodes, and another example objective function seeks to reduce the transport demand between pairs of nodes. Constraints are also considered in the mapping.

Simulation engine 424 supports validation of proposed optimized solutions under user-defined scenarios. The simulation engine, in an example embodiment, uses a process-oriented, discrete event simulation to simulate node demand and capacity levels and traffic routing between the nodes.

In various embodiments, the invention provides automated support for choosing a system configuration. Once a system is configured and operational, the invention monitors operational parameters of the system, stores the operational parameters in a statistics database, and generates an alternate configuration using the operational parameters.

Figure 5:
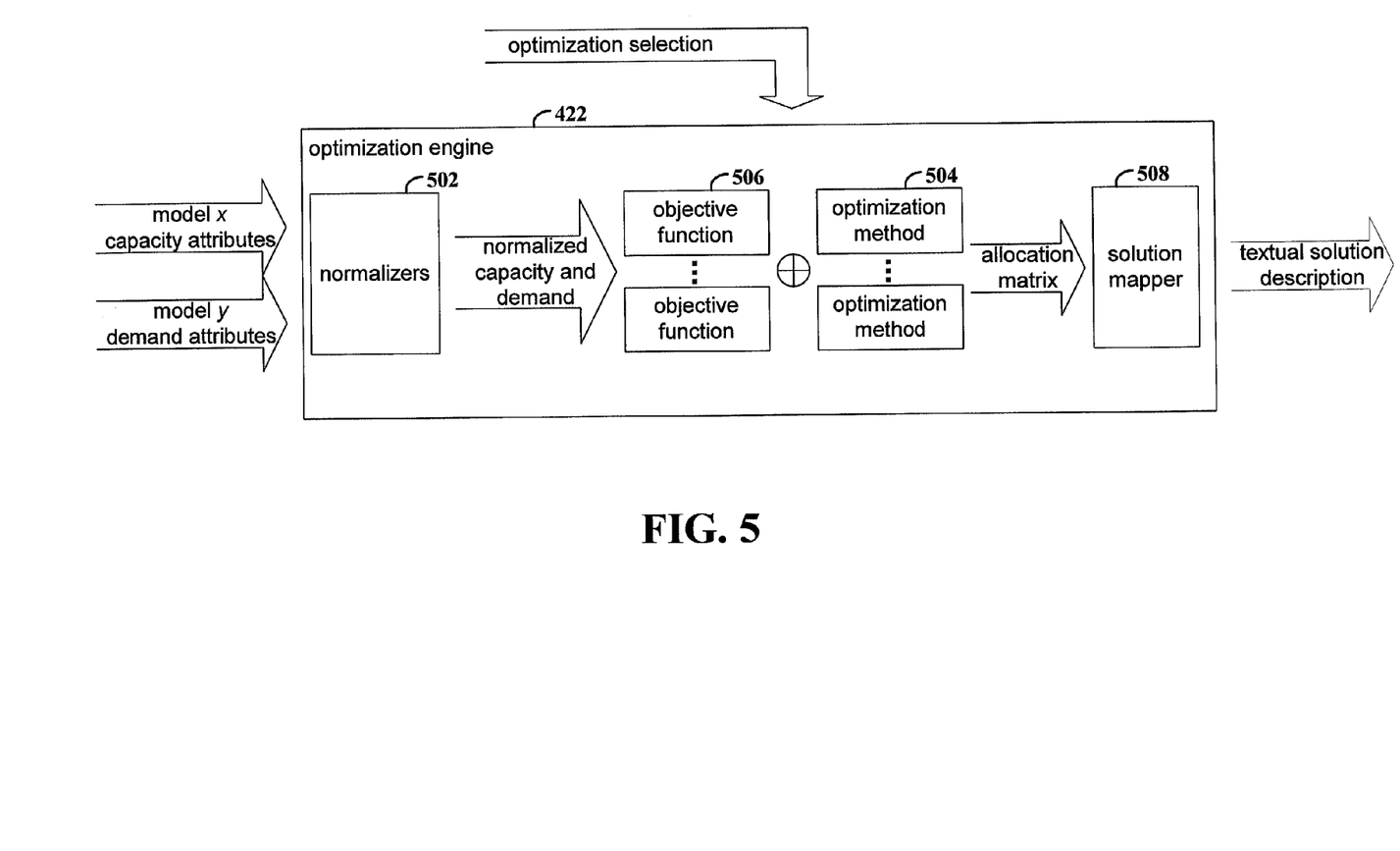
FIG. 5 is a functional block diagram of an optimization engine in accordance with another embodiment of the invention.

FIG. 5 is a functional block diagram of an optimization engine in accordance with one embodiment of the invention. Optimization engine 422 generally generates a mapping of components of model x ("demand model") to components of model y ("capacity model") based on the demand of model x and the capacity of model y. A set of normalizers 502 generate normalized demand and capacity values relative to selected base units. The optimization engine allows the user to evaluate several different solutions by way of selectable optimization methods and objective functions. For example, optimization method 504 is one of several optimization methods, and objective function 506 is one of several objective functions. The user inputs optimization selections, and the optimization engine uses the selected optimization method and objective function in generating a solution. Example optimization methods include genetic algorithms and simulated annealing. Example objective functions include balancing the processing load on the nodes, balancing traffic between the nodes, and minimizing traffic on selected routes. If present, the affinity/repulsion constraint matrix is also used in generating and evaluating solutions. When the optimization method finds a desirable solution, an allocation matrix is provided to solution mapper 508. The allocation matrix indicates which demand-side components (columns) are mapped to which capacity-side components (rows). For example, a binary 1 in $cell_{i,j}$ indicates that component i in the demand model is mapped to component j in the capacity model. The solution mapper translates the allocation matrix into a textual description that identifies the components, for example. In another embodiment, the allocation matrix is translated into control instructions that automate deployment of the various applications and services in the monitored or simulated system.

Objective functions are defined by the user of the optimization engine 422 and translated into code for the optimization engine. When an optimization is being performed, the code associated with the objective functions needs to be referenced as a parameter in order for the optimization engine to apply the function. Because code modules for objective functions are parameterizable, optimizations can be performed according to any kind of policy a user want to implement.

Since optimizations follow the same pattern for all model layers, and the capacity and demand attribute values are normalized, the same generic optimization process can be applied. The optimization process generally follows the following iterative pattern because mapping problems are NP hard:

1. generate a possible solution;
2. evaluate the solution according to constraints and an optimization goal or policy;
   a "better" solution returns a higher value from the evaluation by a objective function;
3. if the evaluated solution is better than prior solutions, replace the worst solution in the solution pool with the generated solution;

4. repeat until some termination criteria applies.

The set of optimization methods and objective functions is orthogonal. Each objective function can be combined with any optimization method. However, different optimization goals require different sets of input parameters referred to in the objective functions. Thus, each objective function also requires its own normalizer for variables within the function. Normalizers 502 include components that convert capacity and demand values for specific machines and services into normalized capacity and demand values, as well as components that convert the normalized capacity and demand values into normalized values for the variables of the objective functions.

The following example illustrates how an example normalizer converts specific values that represent levels of demand to normalized demand values. The example involves a distributed data center (DC) that hosts a service which is dispersed across different geographic locations. The infrastructure (machines, networks, applications) installed in DC1 is capable of handling 5,000 customers per hour of that service. Another DC2 has equipment and software to handle 9,000 customers of that service, and DC3 and DC4 are both capable of handling 2,000 customers each. The numbers of customers that can be served by each data center represents the capacity of each DC for this particular service in this particular environment.

The non-normalized capacity is characterized by the number of customers per hour. The non-normalized capacity value of one of the DCs is selected as the base unit. For example, the 5,000 customers/hour of DC1 is selected as the base unit and DC1 is assigned a normalized capacity of 1.0. The capacity values of the other DCs are normalized relative to the base unit of 5,000 customers/hour. The normalization function performed by the normalizer is:

$$C_{norm} = C_{abs}/C_{base}$$

where $C_{norm}$ is the normalized capacity of the absolute capacity value, $C_{abs}$, and $C_{base}$ is the base unit capacity value (e.g., 5,000 customers/hour). By this division, the customer/hour unit is eliminated. Table 1 below illustrate the non-normalized and normalized capacity values.

TABLE 1

|  | customers/hour (absolute) | Capacity (normalized to DC1) |
| --- | --- | --- |
| DC1 | 5,000 (chosen base unit) | 1.00 |
| DC2 | 9,000 | 1.80 |
| DC3 | 2,000 | 0.40 |
| DC4 | 2,000 | 0.40 |

Similarly, demands can be expressed: a particular procurement system, such as part of SAP, runs on four machines using four data bases behind. Demand on one location can be high, say 1,000 TA/s (transactions per second), on the three other location it may be lower, 250 TA/s. The same game can be played expressing these demands not in terms of 1,000 TA/s and 250 TA/s, but relatively to each other: 1.00 and 0.25, respectively.

The following example illustrates the overall process of generating an optimized solution for a specific set of services. The demand model consists of the services S29, S30, and S31. Table 2 below sets forth the absolute and normalized demand attribute values for the processing and storage requirements of the services.

TABLE 2

|  | $d_p$ | norm($d_p$) | $d_s$ | norm($d_s$) |
| --- | --- | --- | --- | --- |
| S29 | 400 t/s | 1.0 | 12 gb | 1.0 |
| S30 | 900 t/s | 2.25 | 24 gb | 2.0 |
| S31 | 200 t/s | 0.5 | 5 gb | 0.42 |

Table 3 below sets forth the absolute and normalized demand attribute values for communications between the services.

TABLE 3

|  | $d_t$ | norm($d_t$) |
| --- | --- | --- |
| S29–S30 | 200 req/s | 1.0 |
| S29–S31 | 10 req/s | 0.05 |
| S30–S31 | 100 req/sec | 0.5 |

The demand vectors and matrix that correspond to the information in Tables 2 and 3 are:

$$D_p = \begin{bmatrix} 1.0 \\ 2.25 \\ 0.5 \end{bmatrix}$$

$$D_s = \begin{bmatrix} 1.0 \\ 2.0 \\ 0.42 \end{bmatrix}$$

$$D_t = \begin{bmatrix} - & 1.0 & 0.05 \\ 1.0 & - & 0.5 \\ 0.05 & 0.5 & - \end{bmatrix}$$

The capacity vectors ($C_p$ and $C_s$) and matrix ($C_t$) for this example are not explicitly set forth in the interest of brevity. The optimization engine inputs the demand vectors and matrix and the capacity vectors and matrix and performs the iterative process of generating a solution, evaluating the solution with an objective function, and repeating the process until a viable solution is identified. The output data from the optimizer function is a matrix such as:

$$\begin{array}{c} \phantom{N39} \begin{array}{ccc} S29 & S30 & S31 \end{array} \\ \begin{array}{c} N39 \\ N40 \end{array} \begin{bmatrix} 1 & 0 & 1 \\ 0 & 1 & 0 \end{bmatrix} \end{array}$$

where N39 and N40 are the nodes that supply the capacity and to which the services are mapped. The solution mapper provides output data in a form that is more descriptive to a user, for example, "S29 is deployed on N39," or in form of control instructions to a deployment system that performs such instructions in the real system.

In addition to the specific embodiments of the invention explicitly set forth herein, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for identifying optimal allocations of computing resources in a data processing arrangement having a plurality of computing machines that host a plurality of application processes, comprising:
   establishing a plurality of server models, each server model including one or more server nodes, wherein each server node represents hardware and has an associated set of capacity attributes;
   designating a layered relationship between the server models, wherein for a first server-model layer immediately above a second server-model layer, the second server-model layer includes respective models that represent the nodes in the first server-model layer;
   establishing a plurality of service models, each service model including one or more service nodes, wherein each service node represents software and has an associated set of demand attributes and an associated set of capacity attributes;
   designating a layered relationship between the service models, wherein for a first service-model layer immediately above a second service-model layer, the second service-model layer includes respective models that represent the nodes in the first server-model layer, wherein a first service node in the first service-model layer is mappable to at least two or more service nodes in the second service-model layer;
   normalizing the capacity attributes and the demand attributes;
   generating a mapping of service nodes in a first service model in the first service-model layer to service nodes in a second service model in the second service-model layer as a function of the demand attributes of service nodes of the first service model and capacity attributes of service nodes the second service model; and
   generating an optimized mapping of service nodes in a user-selected service model to server nodes in a user-selected server model as a function of the associated sets of demand and capacity attributes.

2. The method of claim 1, wherein the capacity attributes include processing capacity and storage capacity and the demand attributes include processing demand and storage demand.

3. The method of claim 2, further comprising:
   establishing one or more service-node relationships between selected pairs of the service nodes, wherein each service-node relationship has an associated transport demand attribute specifying a quantity of communication resources required for communication between the associated pair of service nodes;
   establishing one or more server-node relationships between selected pairs of the server nodes, wherein each server-node relationship has an associated transport capacity attribute specifying a quantity of communication resources available for communication between the associated pair of server nodes;
   normalizing the transport demand attributes; and
   generating the optimized mapping as a function of the service-node relationships and server-node relationships.

4. The method of claim 3, further comprising:
   selecting one of the server nodes as a base server node;
   normalizing the capacity attributes relative to the capacity attribute of the base server node;
   selecting one of the service nodes as a base service node; and
   normalizing the demand attributes relative to the demand attribute of the base service node.

5. The method of claim 4, wherein each server node has an associated set of demand attributes and further comprising generating an optimized mapping of server nodes in a first user-selected server model to server nodes in a second user-selected server model as a function of the demand attributes of the first server model and capacity attributes of the second server model.

6. The method of claim 1, further comprising:
   establishing one or more service-node relationships between selected pairs of the service nodes, wherein each service-node relationship has an associated transport demand attribute specifying a quantity of communication resources required for communication between the associated pair of service nodes;
   establishing one or more server-node relationships between selected pairs of the server nodes, wherein each server-node relationship has an associated transport capacity attribute specifying a quantity of communication resources available for communication between the associated pair of server nodes;
   normalizing the transport demand attributes; and
   generating the optimized mapping as a function of the service-node relationships and server-node relationships.

7. The method of claim 1, further comprising:
   selecting one of the server nodes as a base server node;
   normalizing the capacity attributes relative to corresponding capacity attributes of the base server node;
   selecting one of the service nodes as a base service node; and
   normalizing the demand attributes relative to corresponding demand attributes of the base service node.

8. The method of claim 1, wherein each server node has an associated set of demand attributes and further comprising generating an optimized mapping of server nodes in a first user-selected server model to server nodes in a second user-selected server model as a function of the demand attributes of the first server model and capacity attributes of the second server model.

9. The method of claim 1, further comprising:
   wherein the server-model layers include a data-center layer, a cluster layer, and a servers layer, the data-center layer having a data-center model representing a plurality of sites, each site having at least one server, the cluster layer having at least one cluster model representing a set of servers, the servers in a set being communicatively coupled, and the servers layer having at least one servers model representing servers in the data processing arrangement;
   wherein the service-model layers include a distributed-applications layer, an application-tasks layer, and an application-process layer, the distributed-applications layer having at least one distributed-application model representing a set of application tasks that are mappable to the plurality of sites in the data-center layer, the application-tasks layer having at least one application-tasks model representing tasks that are mappable to a set of servers in the cluster layer, and the application-process layer having at least one application model representing processes that are mappable to servers in the servers layer;

comparing capacity attributes of the at least one data-center model to demand attributes of a the at least one distributed-application model; and mapping application tasks from the at least one distributed-application model to sites in the at least one data-center model based on comparison of the capacity attributes of the at least one data-center model to demand-attributes of the at least one distributed-application model.

10. The method of claim 9, further comprising:

wherein the server-model layers further include a virtual-service-center layer having at least one virtual-service-center model representing a set of sites from the data-center model;

wherein the service-model layers further include a services layer having at least one service model representing a set of application tasks from a distributed-application model;

comparing capacity attributes of the at least one virtual-service-center model to demand attributes of the at least one service model in the services layer; and mapping application tasks from the at least one virtual-service-center model to the sites in the at least one virtual-service-center model based on comparison of the capacity attributes of the at least one virtual-service-center model to demand attributes of the at least one service model of the services layer.

11. The method of claim 1, further comprising:

wherein the server-model layers include a data-center layer, a cluster layer, and a servers layer, the data-center layer having a data-center model representing a plurality of sites, each site having at least one server, the cluster layer having at least one cluster model representing a set of servers, the servers in a set being communicatively coupled, and the servers layer having at least one servers model representing servers in the data processing arrangement;

wherein the service-model layers include a distributed-applications layer, an application-tasks layer, and an application-process layer, the distributed-applications layer having at least one distributed-application model representing a set of application tasks that are mappable to the plurality of sites in the data-center layer, the application-tasks layer having at least one application-tasks model representing tasks that are mappable to a set of servers in the cluster layer, and the application-process layer having at least one application model representing processes that are mappable to servers in the servers layer;

comparing capacity attributes of the at least one application model to demand attributes of the at least one application-tasks model in the services layer; and mapping tasks from the at least one application-tasks model to processes of the at least one application model based on comparison of the capacity attributes of the at least one application model to demand attributes of the at least one application-tasks model.

12. An apparatus for identifying optimal allocations of computing resources in a data processing arrangement having a plurality of computing machines that host a plurality of application processes, comprising:

means for establishing a plurality of server models, each server model including one or more server nodes, wherein each server node represents hardware and has an associated set of capacity attributes;

means for designating a layered relationship between the server models, wherein for a first server-model layer immediately above a second server-model layer, the second server-model layer includes respective models that represent the nodes in the first server-model layer;

means for establishing a plurality of service models, each service model including one or more service nodes, wherein each service node represents software and has an associated set of demand attributes and an associated set of capacity attributes;

means for designating a layered relationship between the service models, wherein for a first service-model layer immediately above a second service-model layer, the second service-model layer includes respective models that represent the nodes in the first server-model layer, wherein a first service node in the first service-model layer is mappable to at least two or more service nodes in the second service-model layer;

means for normalizing the capacity attributes and the demand attributes;

means for generating a mapping of service nodes in a first service model in the first service-model layer to service nodes in a second service model in the second service-model layer as a function of the demand attributes of service nodes of the first service model and capacity attributes of service nodes the second service model; and means for generating an optimized mapping of service nodes in a user-selected service model to server nodes in a user-selected server model as a function of the associated sets of demand and capacity attributes.

13. A system for identifying optimal allocations of computing resources in a data processing arrangement having a plurality of computing machines that host a plurality of application processes, comprising:

a model repository including a plurality of server models and a plurality of service models, each server model including one or more server nodes and each server node representing hardware and having an associated set of normalized capacity attributes, each service model including one or more service nodes and each service node representing software and having an associated set of normalized demand attributes and an associated set of normalized capacity attributes, wherein the server models are defined in a layered relationship and for a first server-model layer immediately above a second server-model layer, the second server-model layer includes respective models that represent the nodes in the first server-model layer, and the service models are defined in a layered relationship and for a first service-model layer immediately above a second service-model layer, the second service-model layer includes respective models that represent the nodes in the first service-model layer, wherein a first service node in the first service-model layer is mappable to at least two or more service nodes in the second service-model layer; and an optimization engine coupled to the model repository, the optimization engine configured to generate a mapping of service nodes in a first service model in the first service-model layer to service nodes in a second service model in the second service-model layer as a function of the demand attributes of service nodes of the first service model and capacity attributes of service nodes the second service model, and generate an optimized mapping of service nodes in a user-selected service model to server nodes in a user-selected server model as a function of the associated normalized demand and capacity attributes.

14. The system of claim 13, further comprising:

wherein the model repository further includes one or more service-node relationships between selected pairs of the service nodes, each service-node relationship having an associated transport demand attribute that specifies a normalized quantity of communication resources required for communication between the associated pair of service nodes;

wherein the model repository further includes one or more server-node relationships between selected pairs of the server nodes, each server-node relationship having an associated transport capacity attribute that specifies a normalized quantity of communication resources available for communication between the associated pair of server nodes; and the optimization engine is further configured to generate the optimized mapping as a function of the service-node relationships and server-node relationships.

15. The system of claim 13, wherein each server node has an associated set of normalized demand attributes and the optimization engine is further configured to generate an optimized mapping of server nodes in a first user-selected server model to server nodes in a second user-selected server model as a function of the demand attributes of the first server model and capacity attributes of the second server model.

* * * * *

UNITED STATES PATENT AND TRADEMARK OFFICE
CERTIFICATE OF CORRECTION

PATENT NO.        : 7,039,705 B2
APPLICATION NO.   : 10/044882
DATED             : May 2, 2006
INVENTOR(S)       : Sven Graupner et al.

Page 1 of 1

It is certified that error appears in the above-identified patent and that said Letters Patent is hereby corrected as shown below:

On the Title page, in field (74), in "Attorney, Agent, or Firm", in column 2, line 1, delete "Lance" and insert -- Lange --, therefor.

In column 15, line 2, in Claim 9, after "of" delete "a".

Signed and Sealed this

Thirteenth Day of April, 2010

David J. Kappos
*Director of the United States Patent and Trademark Office*